United States Patent
Watanabe et al.

(10) Patent No.: US 8,329,355 B2
(45) Date of Patent: Dec. 11, 2012

(54) FUEL CELL SEPARATOR AND GAS DIFFUSION LAYER

(75) Inventors: Shigeru Watanabe, Kanagawa-Ken (JP); Kenichi Oba, Kanagawa-Ken (JP)

(73) Assignee: NOK Corporation, Tokyo (JP)

( * ) Notice: Subject to any disclaimer, the term of this patent is extended or adjusted under 35 U.S.C. 154(b) by 290 days.

(21) Appl. No.: 12/783,384

(22) Filed: May 19, 2010

(65) Prior Publication Data

US 2010/0330461 A1  Dec. 30, 2010

(30) Foreign Application Priority Data

Jun. 30, 2009 (JP) ................................. 2009-156059

(51) Int. Cl.
 *H01M 8/24* (2006.01)
 *H01M 2/14* (2006.01)
 *H01M 2/20* (2006.01)

(52) U.S. Cl. ........ 429/457; 429/460; 429/463; 429/518; 429/514; 429/508

(58) Field of Classification Search .......... 429/452–463, 429/465, 467–471, 474, 479–494, 507–511
See application file for complete search history.

(56) References Cited

U.S. PATENT DOCUMENTS

| | | | | |
|---|---|---|---|---|
| 6,017,648 A | * | 1/2000 | Jones | 429/434 |
| 6,254,741 B1 | * | 7/2001 | Stuart et al. | 204/254 |
| 6,410,179 B1 | * | 6/2002 | Boyer et al. | 429/457 |
| 6,811,909 B2 | * | 11/2004 | Sugita et al. | 429/434 |
| 7,402,358 B2 | * | 7/2008 | Hanlon | 429/457 |
| 2002/0102453 A1 | * | 8/2002 | Suenaga et al. | 429/37 |
| 2009/0029233 A1 | | 1/2009 | Gerding | |
| 2010/0239953 A1 | * | 9/2010 | Gerding | 429/512 |

FOREIGN PATENT DOCUMENTS

| | | |
|---|---|---|
| JP | 2005-026058 A | 1/2005 |
| JP | 2007-026931 A | 2/2007 |

* cited by examiner

*Primary Examiner* — Keith Walker
(74) *Attorney, Agent, or Firm* — Daniel J. Sepanik, Esq.; Harness, Dickey & Pierce, P.L.C.

(57) ABSTRACT

In a fuel cell, an elastic body provides first protrusion T10 that encompasses the perimeter of the passage hole at plate member 40 and the leading edge of which spans the entire region and tightly adheres to plate member 40, provides second protrusion S20 that is disposed within the placement region of reaction membrane 10 so as to encompass the perimeter of the gas diffusion layer, and provides third protrusion S30 that is disposed to encompass the region at which first protrusion T10 is disposed and the region at which second protrusion S20 is disposed, and is disposed outside the placement region for the reaction membrane, and the leading edge of which spans the entire region and tightly adheres to a separator 30.

2 Claims, 6 Drawing Sheets

(a)  (b)

PRIOR ART

PRIOR ART

PRIOR ART

FUEL CELL SEPARATOR AND GAS DIFFUSION LAYER

CROSS-REFERENCE TO RELATED APPLICATIONS

This application claims the benefit and priority of Japanese Patent Application No. 2009-156059, filed Jun. 30, 2009. The entire disclosure of the above application is incorporated herein by reference.

FIELD

This invention relates to a fuel cell.

BACKGROUND

This section provides background information related to the present disclosure which is not necessarily prior art.

Generally, a fuel cell (polymer electrolyte membrane fuel cell) is structured of a cell stack that overlays multiple single cells. In this regard, a single cell is a structure constituted of an electrolyte membrane, a catalyst layer disposed to envelop the electrolyte membrane, and a gas diffusion layer disposed to envelop both of the former. In addition, the electrodes are structured by the catalyst layer and the gas diffusion layer, with the surface facing the electrolyte membrane being the anode, and the other facing surface being the cathode. Fuel that includes hydrogen is flowed over the anode side, and an oxidizing agent that includes oxygen is flowed over the cathode side, generating electricity by the reaction at the catalyst layer.

The following section describes a fuel cell according to a former technology example by referencing FIGS. 7~12. Furthermore, with this former technology example, there is provided a reaction membrane structured by the integration of an electrolyte membrane and a catalyst layer disposed on each side of the electrolyte membrane. FIG. 7 is a plane view drawing of a portion of the single cell structure in the fuel cell according to the former technology example. FIG. 8 is a typical cross section drawing (a cross section of line BB in FIG. 7) of the single cell structural component in the fuel cell according to the former technology example. FIG. 9 is a typical cross section drawing in which there has been performed component development of the single cell structural component in the fuel cell according to the former technology example. FIG. 10 is a plane view drawing of a portion of the reaction membrane according to the former technology example. FIG. 11 is a plane view drawing of a portion of the gasket that has integrally provided the gas diffusion layer according to the former technology example. FIG. 12 is a plane view drawing of a portion of the separator according to the former technology example.

As described above, the fuel cell is a structure in which a single cell provides multiple overlaid separators. The following explanation describes only the single cell structural component that is structured by the members that structure the single cell.

Single cell structural component 200 is structured by reaction membrane 210, gasket 220 that provides anode side gas diffusion layer 221a and cathode side gas diffusion layer 221b disposed so as to envelop reaction membrane 210, and a pair of separator 230 disposed so as to envelop all of the former.

Additionally, at single cell structural component 200, there is disposed fuel manifold R10 for supplying fuel to anode side gas diffusion layer 221a, and disposed oxidizing agent manifold R20 for supplying an oxidizing agent to cathode side gas diffusion layer 221b. Moreover, at single cell structural component 200, there is also disposed cooling water manifold R30 as the flow route for cooling water (refer to FIG. 7).

The following section describes gasket 220 by referencing FIG. 11 in particular. Gasket 220 is structured by anode side gas diffusion layer 221a, cathode side gas diffusion layer 221b, and elastic body 225 disposed integrally with the former. Additionally, at elastic body 225, there are formed first passage hole 222 that forms a part of fuel manifold R10, second passage hole 223 that forms a part of oxidizing agent manifold R20, and third passage hole 224 that forms a part of cooling water manifold R30. Moreover, at elastic body 225, there is disposed protrusion S that tightly adheres to such as separator 230. In FIGS. 7 and 11, the position of this disposed protrusion S is shown by dotted line SL.

The following section describes separator 230 by referencing FIG. 12 in particular. FIG. 12 (a) shows the surface of the anode side, and FIG. 12 (b) shows the surface of the cathode side. At separator 230, there are formed first passage hole 232 that forms a part of fuel manifold R10, second passage hole 233 that forms a part of oxidizing agent manifold R20, and third passage hole 234 that forms a part of cooling water manifold R30. That being the case, at the surface of the anode side of separator 230, there is formed recessed section 235a adjacent to first passage hole 232, and there are formed, so as to pass through recessed section 235a, a plurality of channel 231a that forms a flow route between first passage hole 232 and anode side gas diffusion layer 221a. Moreover, at the surface of the cathode side of separator 230, there is formed recessed section 235b adjacent to second passage hole 233, and there are formed, so as to pass through recessed section 235b, a plurality of channel 231b that forms a flow route between second passage hole 233 and cathode side gas diffusion layer 221b.

That being the case, into recessed section 235a and recessed section 235b, there are installed respective occurrences of plate member (bridge) 240, in such a way as to cross over the plurality of channel 231a and of 231b.

With the above described structure, fuel from fuel manifold R10 (first passage holes 222 and 232) is sent to anode side gas diffusion layer 221a, and oxidizing agent from oxidizing agent manifold R20 (second passage holes 223 and 233) is sent to cathode side gas diffusion layer 221b. In this way, the hydrogen contained in the fuel and the oxidizing agent react, resulting in electricity.

In this instance, protrusion S disposed on elastic body 225 is disposed for the purpose of isolating the companion regions to which respectively flow fuel, oxidizing agent, and cooling water. To be specific, protrusion S is established to form tightly sealed regions, and most of its components manifest the function of a seal protrusion. Basically, it is disposed to respectively encompass anode side gas diffusion layer 221a, cathode side gas diffusion layer 221b, and the passage holes that form a part of each manifold.

As described above, with this former technology example, a plurality of channels 231a and of 231b are formed in separator 230 in order to send fuel to anode side gas diffusion layer 221a and oxidizing agent to cathode side gas diffusion layer 221b. That being the case, plate member 240 is attached so as to cross over the plurality of 231a and of 231b, and protrusion S is made to tightly adhere in a way that crosses over plate member 240 (FIG. 7). The following section explains the reason for adopting this type of structure. Moreover, because the anode side and cathode side are of an identical structure, the following explanation uses the cathode side as an example.

The oxidizing agent that flows through oxidizing agent manifold R20 is sent to cathode side gas diffusion layer 221b, as described above. Accordingly, with the former technology, it was sufficient to utilize a space to connect the spatial region of oxidizing agent manifold R20 to the spatial region that faces cathode side gas diffusion layer 221b, and as long as there is assured a flow route for the oxidizing agent, then the channel, plate member, and protrusion described above are not necessary. On the other hand, in order that oxidizing agent flowing from oxidizing agent manifold R20 not leak to the anode side, at the anode side, the protrusion that encompasses oxidizing agent manifold R20 is necessary. Therefore, in order to cause more reliable adhesion of protrusion S1 to separator 230 and thereby manifest seal performance, it is necessary to support protrusion S1 from the opposite side. On that point, with the former technology example, in order to support the opposite site of protrusion S1, there is disposed a protrusion (protrusion S2 in FIG. 8) tightly adhered against separator 230 at an identical position directly behind protrusion S1. However, if there is only disposing of this protrusion S2, there would result a blockage between the spatial region of oxidizing agent manifold R20 and the spatial region that faces cathode side gas diffusion layer 221b. Consequently, after having established the plurality of channel 231b that become flow routes for the oxidizing agent, there is established plate member 240 in order that protrusion S2 will not be pushed into within channel 231b.

As described above, of the occurrences of protrusion S disposed on elastic body 225, those components that cross over the section between the manifold and the gas diffusion layer to which gas is sent from the manifold are not disposed for the purpose of forming a tightly sealed region by their presence, but are disposed for supporting the protrusion (seal protrusion) at the opposite side.

That being the case, in order to manifest stable seal performance, during the condition in which plate member 240 has been attached to recessed sections 235a and 235b of separator 230, it is ideal for there not to be generated a difference in dimension to the surface of separator 230.

However, to make favorable the installability, a clearance is established between the inner side surface of recessed sections 235a and 235b and the outer side surface of plate member 240. As a consequence, for example, as shown by section X of FIG. 8, a gap is generated between the inner side surface of recessed sections 235a and 235b and the outer side surface of plate member 240. Additionally, a difference in dimension may also be generated at the section shown by X1 of FIG. 7, due to the impact of a dimensional aberration for the depth of recessed sections 235a and 235b and the thickness of plate member 240. Furthermore, reaction membrane 210 is encompassed by gasket 220 having a surface area larger than reaction membrane 210, and therefore a difference in dimension may also be generated at the edge vicinity of reaction membrane 210 (section X2 of FIG. 7, for example).

The above described gaps and differences of dimension may adversely impact seal performance.

Furthermore, reaction membrane 210 that structures the single cell structural component shown in FIGS. 7-9 is structured so that the surface area is smaller than that of separator 230, as shown in FIG. 10 (a). In relation to this, when using a reaction membrane that is of identical size to that of separator 230, such as reaction membrane 210X shown in FIG. 10 (b), there is to a degree enabled the elimination of the problem of reduced seal performance due to the existence of a difference in dimension. However, the membrane is in general exceptionally expensive, and therefore it is desirable to use that which has as small an area as possible, by disposing the membrane only in the vicinity of the reaction region for the hydrogen and oxidizing agent.

SUMMARY

This section provides a general summary of the disclosure, and is not a comprehensive disclosure of its full scope or all of its features.

The purpose of this invention is to provide a fuel cell capable of improving seal performance.

This invention implements the following means to solve the above described problem.

Specifically, the fuel cell of this invention is structured by a plurality of an overlaying single cell, each of which is structured of a reaction membrane structured by an electrolyte membrane and a catalyst layer disposed on each side of the electrolyte membrane, of a pair of a gas diffusion layer disposed so as to envelop the reaction membrane, and of a pair of a facing surface of a separator disposed so as to envelope all of the former, wherein the fuel cell is one that, at the pair of a separator, at the outer side of the placement region for the reaction membrane, has respectively disposed a passage hole that forms a part of each of a manifold that passes through the overlaying direction of the single cells, wherein, at the periphery of the pair of a gas diffusion layer, there is for each integrally disposed an elastic body, wherein at the pair of a separator, there is for each formed a recessed section disposed in the region that includes the passage hole, and formed a plurality of a channel so as to pass through the recessed section and that form a flow route between the passage hole and the gas diffusion layer, and each separator of the pair of a separator also possesses passage holes that form a part of each manifold, and provides a plate member that is attached to within the recessed section so as to cross over the plurality of a channel, and wherein the elastic body provides a first protrusion that encompasses the perimeter of the passage hole in the plate member, and the leading edge of which spans the entire region and tightly adheres to the plate member, and provides a second protrusion that is disposed within the placement region for the reaction membrane, so as to encompass the perimeter of the gas diffusion layer, and provides a third protrusion disposed to encompass the region at which the first protrusion is disposed and the region at which the second protrusion is disposed, and is disposed outside the placement region for reaction membrane, and the leading edge of which spans the entire region and tightly adheres to the separator.

By use of this invention, a first protrusion has a leading edge that spans the entire region and tightly adheres to the plate member. Accordingly, it does not pass over a difference of dimension possible between the plate member and the separator, and therefore it enables manifesting stable seal performance. Thereafter, by use of a second protrusion there is enabled suppressing the leakage of reaction gas (fuel and oxidizing agent) to outside the reaction region. Additionally, by use of a third protrusion there is enabled suppressing the leakage of fluid within the fuel cell to outside the fuel cell. Thereafter, the third protrusion is disposed so as to encompass the region wherein the first protrusion is disposed and the region wherein the second protrusion is disposed, thereby enabling suppressing the leakage to the exterior of the fuel cell of fluid that has leaked from these regions. Moreover, the third protrusion is disposed outside the region of the reaction membrane, and therefore its leading edge spans the entire region and tightly adheres to the separator, without passing over a difference of dimension which may be produced by the reaction membrane.

That being the case, it is preferable that the elastic body disposed at the periphery of one of the pair of a gas diffusion layer and the elastic body disposed at the periphery of the other of the pair of a gas diffusion layer be integrally structured by unified forming, and that by articulating a component which is part of the integrally structured elastic body and is between the pair of a gas diffusion layer, there is placing of the pair of a gas diffusion layer so as to envelop the reaction membrane.

By arranging as such, there is enabled reducing the quantity of components. Additionally, there can be easily performed position alignment of the placement relationship of the pair of gas diffusion layers relative to the reaction membrane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Mode of Implementing the Invention

The following section describes in detail, as an example based on an embodiment, a mode for implementing the invention, by referencing the drawings. However, to the extent not specifically recorded, the dimensions, materials, shapes, and relative placement of structural components recorded in this embodiment do not have the intent of limiting the scope of the invention to only those factors.

(Embodiment)

The following section describes a fuel cell according to an embodiment of this invention by referencing the drawings. Furthermore, as noted above, the fuel cell is a structure that provides a cell stack of multiple overlaying single cells. The plurality of single cells that structure the cell stack are all of an identical structure. Accordingly, in the following description, there is described only the single cell structural component structured by members that structure the single cell, and a detailed description of the cell stack is omitted. Furthermore, the shape of the single cell according to this embodiment is a symmetrical shape that doubles over centerline L, and in FIGS. 1, 4, 5, and 6, only one side from centerline L is shown.

Single Cell Structural Component

Figure 1:
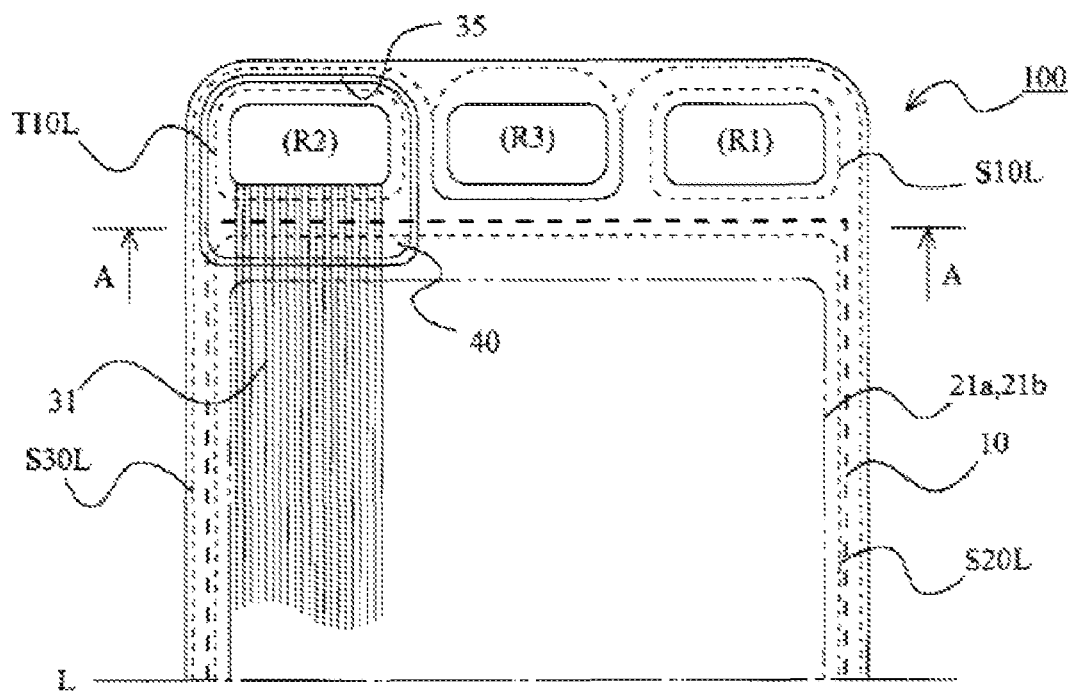
FIG. 1 is a plane view drawing of a portion of the single cell structural component in the fuel cell according to an embodiment of this invention.
Figure 2:
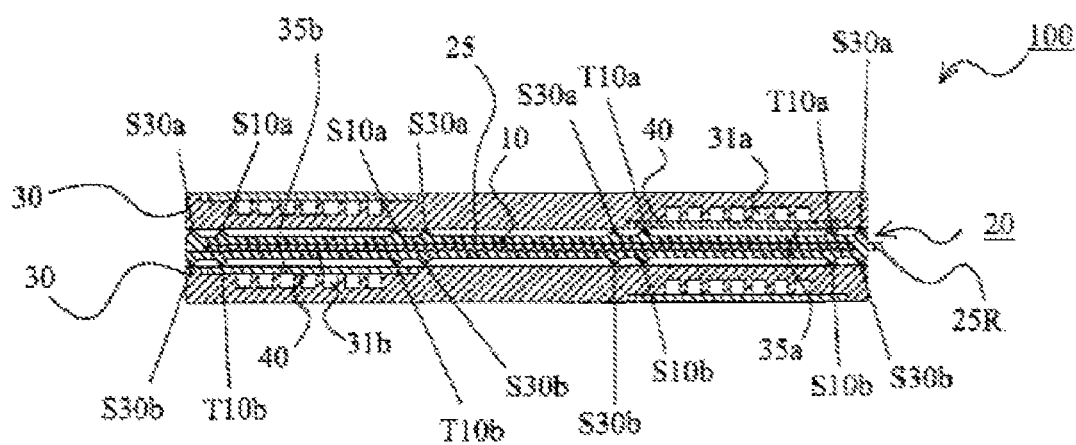
FIG. 2 is a typical cross section drawing (a cross section of line AA in FIG. 1) of the single cell structural component in the fuel cell according to the embodiment of this invention.
Figure 3:
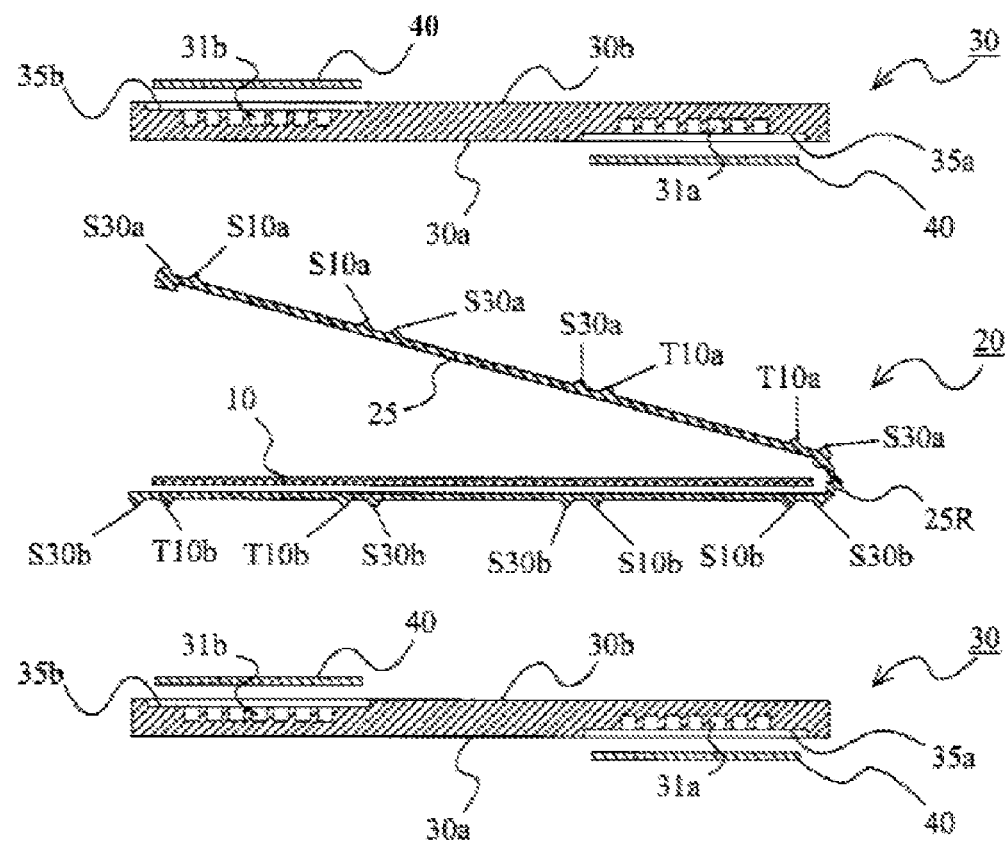
FIG. 3 is a typical cross section drawing in which there has been performed component development of the single cell structural component in the fuel cell according to the embodiment of this invention.
Figure 4:
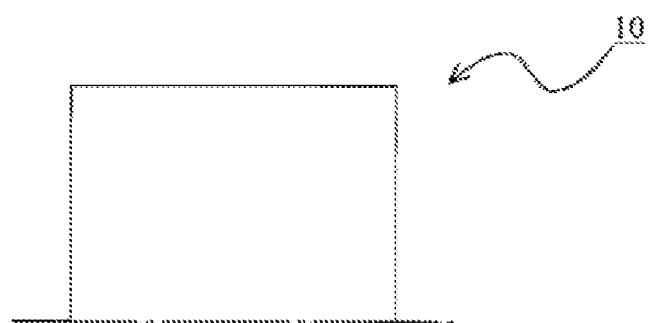
FIG. 4 is a plane view drawing of a portion of the reaction membrane according to the embodiment of this invention.

Single cell structural component 100 is structured of reaction membrane 10, gasket 20 that provides anode side gas diffusion layer 21a and cathode side gas diffusion layer 21b disposed so as to envelop reaction membrane 10, and a pair of separators 30 disposed so as to envelop all of the former (refer to FIGS. 1-3). Reaction membrane 10 according to this embodiment is a membrane integrally structured of an electrolyte membrane for which there is disposed on both sides a catalyst layer (CCM).

Moreover, the single cell of single cell structural component 100 is structured of reaction membrane 10, gasket 20 that provides anode side gas diffusion layer 21a and cathode side gas diffusion layer 21b disposed so as to envelop reaction membrane 10, and the facing surfaces of the pair of separators 30 disposed so as to envelop all of the former. To be specific, for the pair of separators 30, the surface that is not a facing surface (in FIG. 2, the upper surface of upper side separator 30 and the lower side surface of lower side separator 30) is not part of the structure of the single cell shown in FIG. 2, but when the cell stack has been structured, the surface becomes a structural component of the single cell respectively adjacent to the single cell being described.

Additionally, at single cell structural component 100, there is disposed fuel manifold R1, being a flow route for fuel, for supplying fuel to anode side gas diffusion layer 21a, and disposed oxidizing agent manifold R2, being a flow route for oxidizing agent, for supplying oxidizing agent to cathode side gas diffusion layer 21b. Furthermore, at single cell structural component 100, there is also disposed cooling water manifold R3, being a flow route for cooling fluid (FIG. 1).

A cell stack is structured by multiple overlaying of the single cell (single cell structural component 100) as structured above. Moreover, the cell stack, as described above, is a structure of multiple overlaying single cells, and does not require illustrating, so it is not specifically illustrated. That being the case, a fuel cell is structured by installing a suitable component such as a retaining member to retain the multiple single cells (single cell structural component) in an overlaying state within the cell stack, for example.

Gasket

Figure 5:
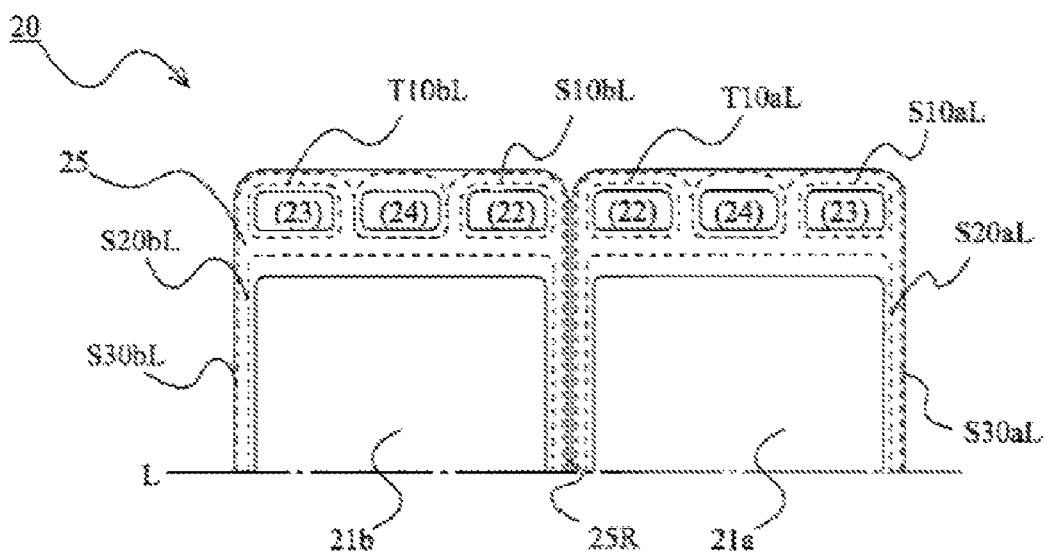
FIG. 5 is a plane view drawing of a portion of the gasket that has integrally provided the gas diffusion layer according to the embodiment of this invention.

The following section describes gasket 20 by referencing FIG. 5 in particular. Gasket 20 is structured of a pair of a gas diffusion layer GDL (anode side gas diffusion layer 21a and cathode side gas diffusion layer 21b), and of elastic body 25 disposed integrally with the former. More specifically, elastic body 25 is integrally established at the periphery of the gas diffusion layer by causing impregnation through injection molding a liquefied resin at the gas diffusion layer.

Additionally, at elastic body 25 there are formed first passage hole 22 that forms a part of fuel manifold R10, second passage hole 23 that forms a part of oxidizing agent manifold R20, and third passage hole 24 that forms a part of cooling water manifold R30. Moreover, at elastic body 225, there are disposed protrusions S10a, S10b, S20a, S20b, S30a, S30b, T10a, and T10b that tightly adhere to such as separator 230. In FIGS. 1 and 5, the positions at which these protrusions are disposed are shown by dotted lines S10aL, S10bL, S20aL, S20bL, S30aL, S30bL, T10aL, and T10bL.

Gasket 20 according to this embodiment is a structure that has provided elastic body 25 integrally structured by unified formation of the elastic body disposed at the periphery of anode side gas diffusion layer 21a and the elastic body disposed at the periphery of cathode side gas diffusion layer 21b. Then, by articulating component 25R of elastic body 25, which is between anode side gas diffusion layer 21a and cathode side gas diffusion layer 21b, there is adoption of a structure that places anode side gas diffusion layer 21a and cathode side gas diffusion layer 21b so as to envelop reaction membrane 10 (refer to FIGS. 2, 3 and 5).

Separator

Figure 6:
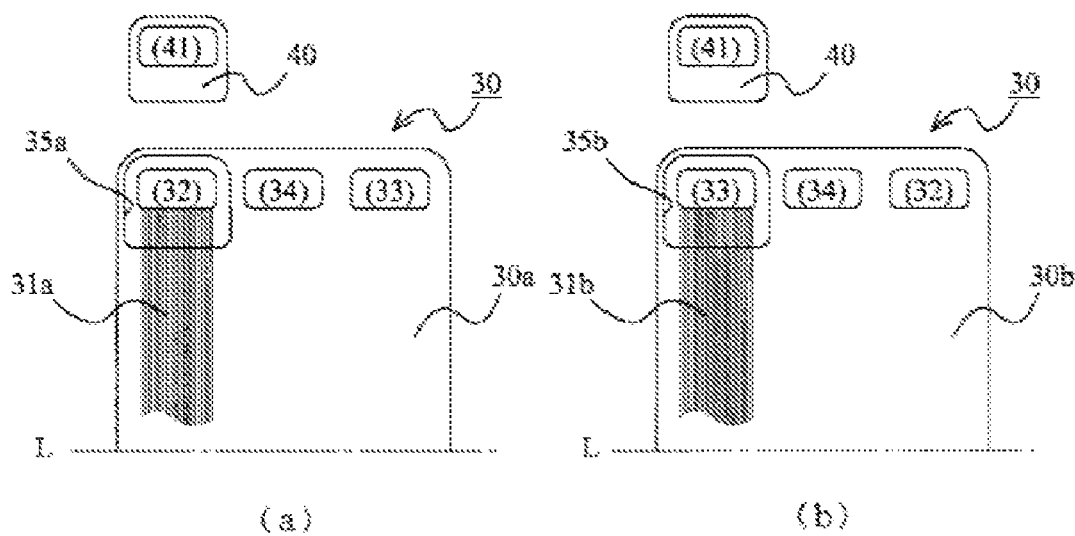
FIG. 6 is a plane view drawing of a portion of the separator according to the embodiment of this invention.
Figure 7:
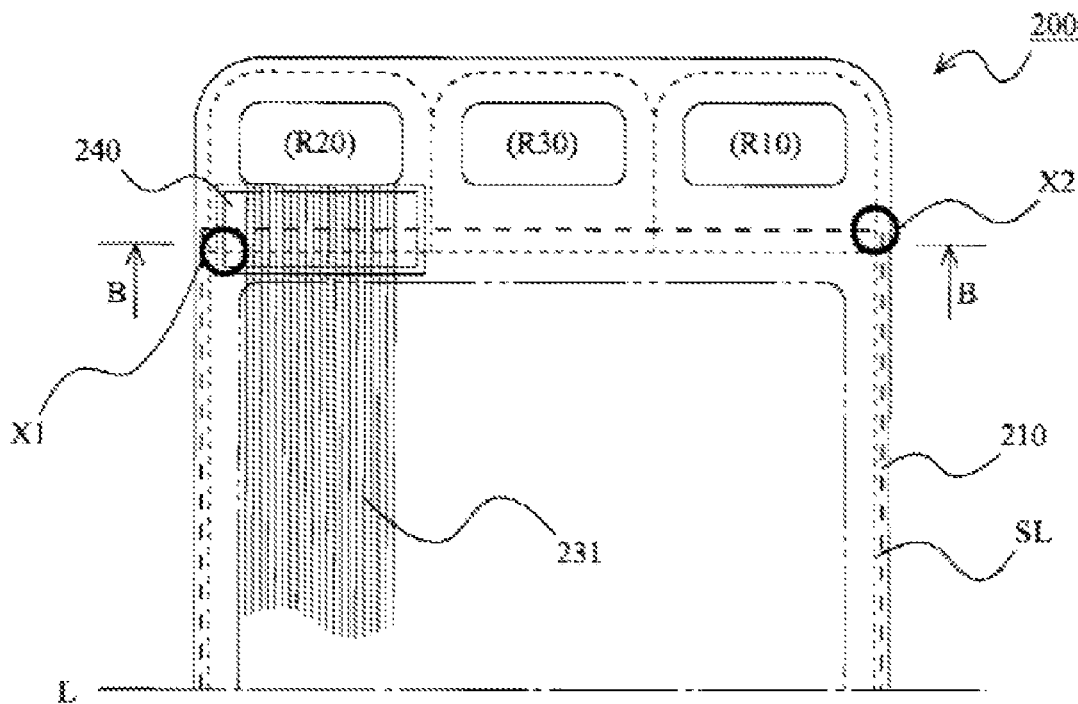
FIG. 7 is a plane view drawing of a portion of the single cell structure in the fuel cell according to a former technology example.
Figure 8:
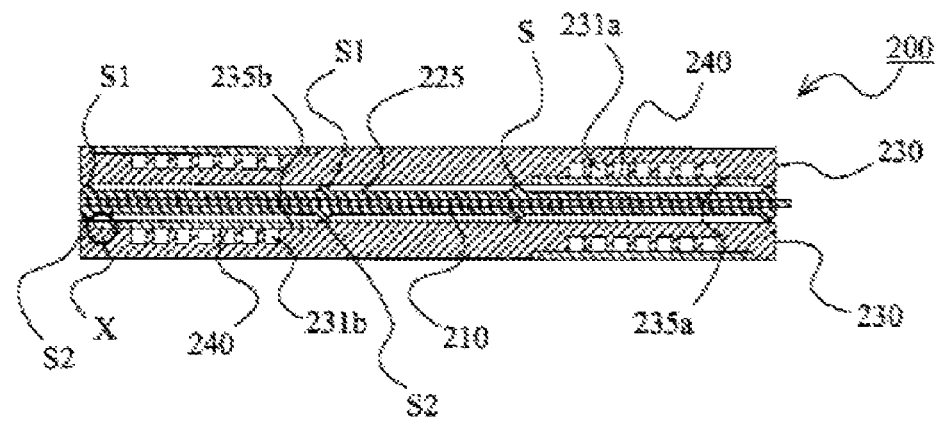
FIG. 8 is a typical cross section drawing (a cross section of line BB in FIG. 7) of the single cell structural component in the fuel cell according to the former technology example.
Figure 9:
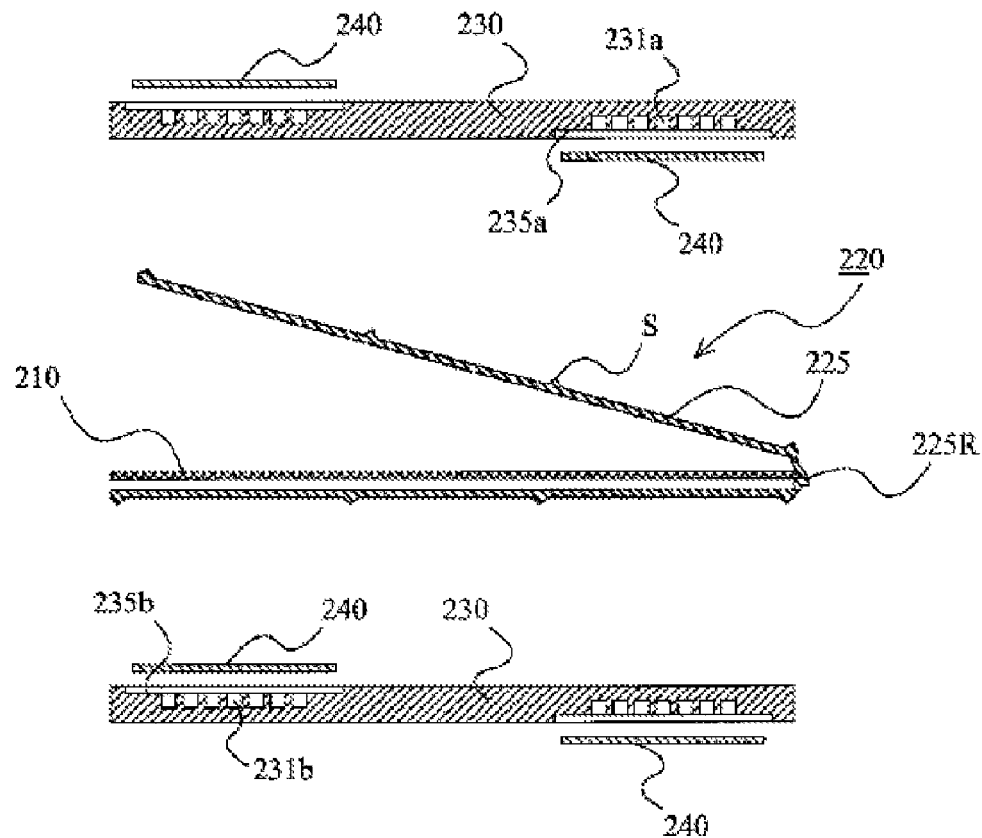
FIG. 9 is a typical cross section drawing in which there has been performed component development of the single cell structural component in the fuel cell according to the former technology example.
Figure 10:
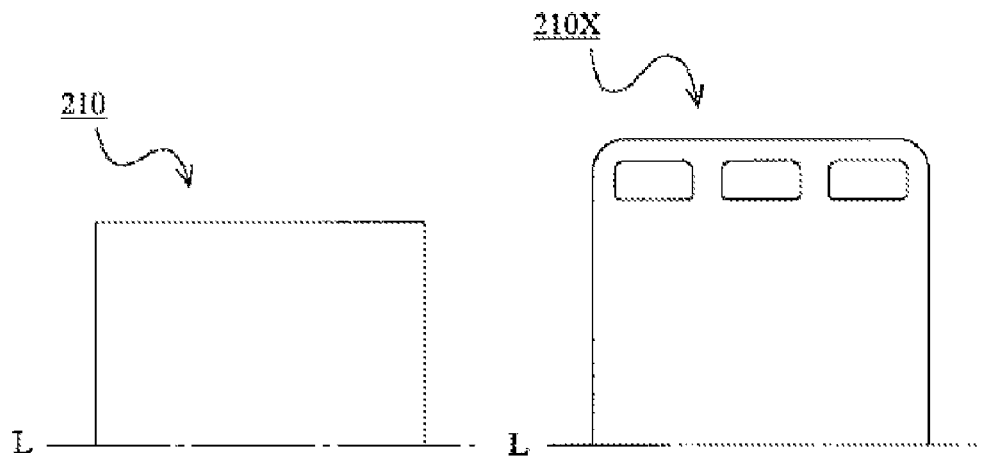
FIG. 10 is a plane view drawing of a portion of the reaction membrane according to the former technology example.
Figure 11:
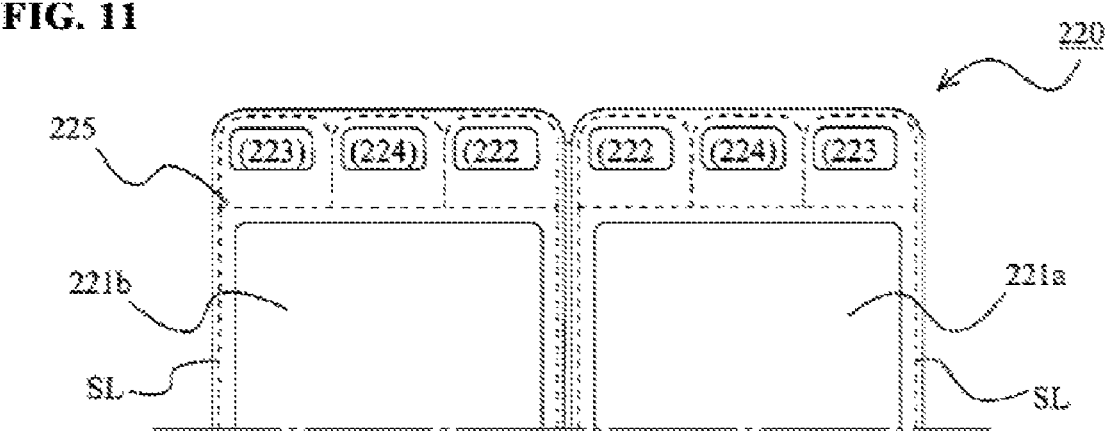
FIG. 11 is a plane view drawing of a portion of the gasket that has integrally provided the gas diffusion layer according to the former technology example.
Figure 12:
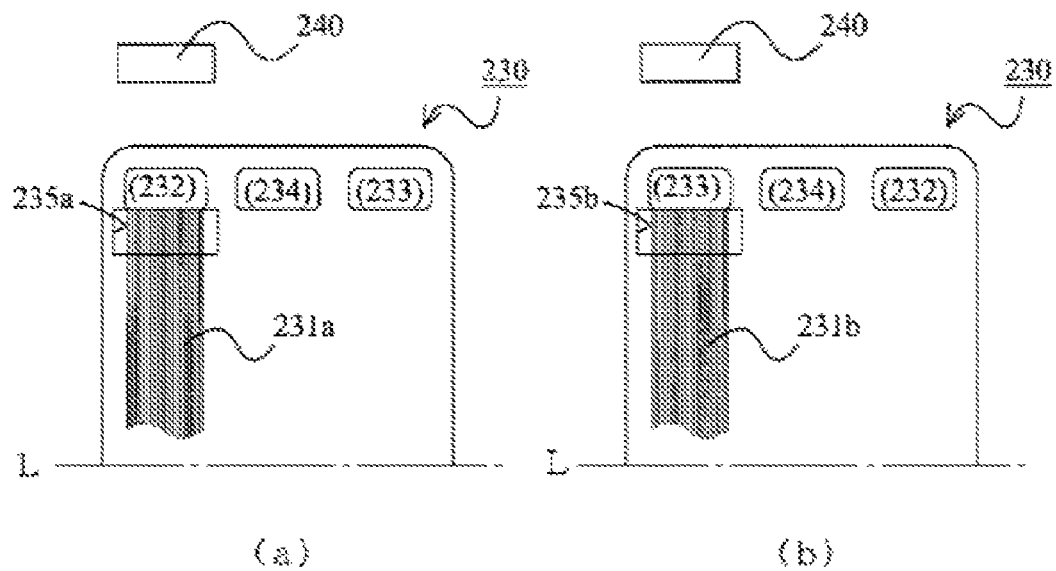
FIG. 12 is a plane view drawing of a portion of the separator according to the former technology example.

The following section describes separator 30 by referencing FIG. 6 in particular. FIG. 6 (a) shows the surface of the anode side, and FIG. 6 (b) shows the surface of the cathode side. At separator 30, there are formed first passage hole 32 that forms a part of fuel manifold R10, second passage hole 33 that forms a part of oxidizing agent manifold R20, and third passage hole 34 that forms a part of cooling water manifold R30.

That being the case, at the surface of the anode side of separator 30, there is formed recessed section 35a disposed in a region that includes first passage hole 32, and there are formed, so as to pass through recessed section 35a, a plurality of channels 31a that forms a flow route between first passage hole 32 and anode side gas diffusion layer 21a. Moreover, at the surface of the cathode side of separator 30, there is formed recessed section 35b disposed in a region that includes second passage hole 33, and there are formed, so as to pass through recessed section 35b, a plurality of channels 31b that forms a flow route between second passage hole 33 and cathode side gas diffusion layer 21b.

That being the case, at recessed section 35a and recessed section 35b, there are installed respective occurrences of plate member 40. In this instance, plate member 40 possesses passage hole 41 that forms part of the manifold, and it is attached so as to cross over the plurality of channels 31a and of 31b.

With the above described structure, fuel from fuel manifold R1 (first passage holes 22 and 32) is sent to anode side gas diffusion layer 21a, and oxidizing agent from oxidizing agent manifold R2 (second passage holes 23 and 33) is sent to cathode side gas diffusion layer 21b. In this way, the hydrogen contained in the fuel and the oxidizing agent react, resulting in electricity.

Protrusions Disposed on the Elastic Body

The following section describes in detail protrusions S10a, S10b, S20a, S20b, S30a, S30b, T10a, and T10b provided on elastic body 25. These protrusions are established in order to isolate the companion regions to which respectively flow fuel, oxidizing agent, and cooling water. Of the protrusions provided on elastic body 25 according to this embodiment, protrusions S10a, S10b, S20a, S20b, S30a, and S30b are disposed to form tightly sealed regions, and T10a and T10b are disposed to support the protrusion of the opposite side (rear surface side). Furthermore, the suffix letter "a" shows a protrusion on the anode side, the suffix letter "b" shows a protrusion on the cathode side, and when neither "a" nor "b" is suffixed, it indicates no discriminating of either side. Moreover, the suffix "L" shows a region at which the protrusion is placed. In FIG. 5, there is shown the condition in which the surface of the side to which the protrusions are not disposed is the upward facing surface.

With elastic body 25 according to this embodiment, there are established, as major classifications, four types of protrusions (hereafter named first protrusion T10, second protrusion S20, third protrusion S30, and fourth protrusion 510).

First protrusion T10 encompasses the perimeter of passage hole 41 at plate member 40, and the related leading edge is structured to span the entire region and to tightly adhere to plate member 40. At the position directly behind this first protrusion T10, there is disposed fourth protrusion S10.

At fourth protrusion S10, fourth protrusion S10a is disposed on the anode side and fourth protrusion S10b is disposed on the cathode side. Fourth protrusion S10a is established to prevent oxidizing agent from leaking to anode side gas diffusion layer 21a and fourth protrusion S10b is established to prevent fuel from leaking to cathode side gas diffusion layer 21b. The leading edges of fourth protrusions S10a and S10b span the entire regions and tightly adhere to separator 30.

That being the case, directly behind fourth protrusions S10a and S10b are disposed first protrusions T10b and T10a to support fourth protrusions S10a and S10b. In this way, elastic reaction force is obtained, and fourth protrusions S10a and S10b are more reliably adhered to separator 30.

Second protrusion S20 is disposed within the placement region for reaction membrane 10, in order to encompass the perimeter of the gas diffusion layer. Furthermore, at second protrusion S20, second protrusion S20a is disposed on the anode side and second protrusion S20b is disposed on the cathode side. Second protrusion S20a is established to encompass the perimeter of anode side gas diffusion layer 21a, and second protrusion S20b is established to encompass the perimeter of cathode side gas diffusion layer 21b. In this way, reaction gas (fuel and oxidizing agent) is prevented from leaking to outside the reaction region.

Third protrusion S30 is disposed to encompass the region at which first protrusion T10 is disposed (identical to the region at which fourth protrusion 510 is disposed) and the region at which second protrusion S20 is disposed, and is disposed outside the placement region for reaction membrane 10, and is disposed so that the related leading edge spans the entire region and tightly adheres to separator 30. Furthermore, third protrusion S30 possesses a component to encompass the perimeter of cooling water manifold R3 (as well as third passage holes 24 and 34 that form part of the manifold) (refer to FIG. 5). Additionally, third protrusion S30 has third protrusion S30a disposed on the anode side and third protrusion S30b disposed on the cathode side.

Superior Attributes of this Embodiment

As described above, with the fuel cell (single cell) according to this embodiment, first protrusion T10 has a leading edge that spans the entire region and tightly adheres plate member 40. In this way, with this embodiment, even if a difference in dimension is generated between plate member 40 and separator 30, the protrusion (first protrusion T10) disposed to encompass the perimeter of the manifold (as well as the passage holes that form a part of the manifold) does not cross the difference in dimension. Accordingly, there is enabled manifesting stable seal performance.

Additionally, by use of second protrusion S20, reaction gas (the hydrogen included in the fuel and the oxidizing agent) is prevented from leaking to outside the reaction region.

Furthermore, by use of third protrusion S30, fluids within the fuel cell are prevented from leaking to outside the fuel cell. Therefore, because third protrusion S30 is disposed to encompass the region at which first protrusion T10 is disposed (identical to the region at which fourth protrusion S10 is disposed) and the region at which second protrusion S20 is disposed, there is enabled suppressing of leakage to the exterior of the fuel cell of fluid that has leaked from these regions. Moreover, third protrusion S30 is disposed outside the region of the reaction membrane, and therefore its leading edge spans the entire region and tightly adheres to the separator, without passing a difference of dimension which may be produced by the reaction membrane, and thereby is manifested stable seal performance.

Therefore, by use of the fuel cell according to this embodiment, there is enabled adoption of a structure for which the manifolds are formed at the outer side of a region at which reaction membrane 10 is disposed, rendering unnecessary the making of the generally expensive reaction membrane 10 to the same size as separator 30, and thereby restraining cost increase. Even so, there is also enabled avoiding of adverse impact on seal performance by a difference of dimension that may be generated by reaction membrane 10.

Additionally, with this embodiment, there is adopted gasket 20 that has provided elastic body 25 integrally structured by unified forming of an elastic body that is disposed at the periphery of anode side gas diffusion layer 21a with an elastic body that is disposed at the periphery of cathode side gas diffusion layer 21b.

Accordingly, in comparison to that which has structured these separately, there is enabled a reduction of the component quantity. Moreover, there can be easily performed position alignment of the placement relationship of the pair of a gas diffusion layer relative to the reaction membrane.

Description of The Symbols
10 Reaction Membrane
20 Gasket
21a Anode Side Gas Diffusion Layer
21b Cathode Side Gas Diffusion Layer
22 First Passage Hole
23 Second Passage Hole
24 Third Passage Hole
25 Elastic Body
30 Separator
31a, 31b Channel
32 First Passage Hole
33 Second Passage Hole
34 Third Passage Hole
35a, 35b Recessed Section
40 Plate Member
41 Passage Hole
100 Single Cell Structural Component
R1 Fuel Manifold
R2 Oxidizing Agent Manifold
R3 Cooling Water Manifold
S10 Fourth Protrusion
S20 Second Protrusion
S30 Third Protrusion
T10 First Protrusion The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A fuel cell, comprising:
a plurality of overlaying single cells, each of which includes a reaction membrane including an electrolyte membrane and a catalyst layer disposed on each side of the electrolyte membrane, a pair of a gas diffusion layers disposed so as to envelop the reaction membrane, and a pair of a facing surfaces of a pair of separators disposed so as to envelop all of the former,
wherein the pair of separators, at a location outward from a placement region for the reaction membrane, has respectively disposed a passage hole that forms a part of each of a manifold that passes through the overlaying direction of the single cells,
wherein an elastic body is integrally disposed at a periphery of the pair of a gas diffusion layers,
wherein the pair of separators each include a recessed section around a region that includes the passage hole, and formed a plurality of channels so as to pass through the recessed section and that form a flow route between the passage hole and the gas diffusion layer,
and each separator of the pair of separators also possess passage holes that form a part of each manifold, and provides a plate member that is attached within the recessed section so as to cross over the plurality of channels, said plate member having a passage hole therein,
and wherein the elastic body includes:
a first protrusion that encompasses the perimeter of the passage hole in the plate member, and a leading edge of which spans an entire region and tightly adheres to the plate member,
a second protrusion that is disposed within the placement region for the reaction membrane, so as to encompass the perimeter of the gas diffusion layer, and
a third protrusion disposed to encompass the region at which the first protrusion is disposed and the region at which the second protrusion is disposed, and is disposed outside the placement region for reaction membrane, and the leading edge of which spans the entire region and tightly adheres to the separator.

2. A fuel cell according to claim 1 wherein the elastic body disposed at the periphery of the pair of gas diffusion layers are integrally structured by unified forming, and includes an articulating component which is part of the integrally structured elastic body and is connected between the pair of gas diffusion layers, wherein the pair of gas diffusion layers envelop the reaction membrane.

* * * * *